United States Patent [19]
Akiyama et al.

[11] Patent Number: 4,792,822
[45] Date of Patent: Dec. 20, 1988

[54] CAMERA WITH CHANGEABLE FOCAL LENGTH

[75] Inventors: Kazuhiro Akiyama; Takao Koda; Masao Shoji; Toshio Yodhida; Masayoshi Hirai, all of Saitama, Japan

[73] Assignee: Fuji Photo Film Co., Ltd., Kanagawa, Japan

[21] Appl. No.: 133,728

[22] Filed: Dec. 15, 1987

[30] Foreign Application Priority Data

Dec. 15, 1986 [JP] Japan ................................ 61-298522

[51] Int. Cl.⁴ ............................ G03B 3/10; G03B 5/00
[52] U.S. Cl. ................................ 354/403; 354/195.12
[58] Field of Search ............ 354/400, 402, 403, 195.1, 354/195.11, 195.12, 195.13

[56] References Cited

U.S. PATENT DOCUMENTS

| | | | |
|---|---|---|---|
| 4,367,934 | 1/1983 | Matsui | 354/403 |
| 4,536,068 | 8/1985 | Kodaira | 354/195.12 |
| 4,582,411 | 4/1986 | Ohmura et al. | 354/403 |
| 4,627,699 | 12/1986 | Takagi | 354/400 |
| 4,643,555 | 2/1987 | Wakabayashi | 354/403 |
| 4,660,954 | 4/1987 | Fujita et al. | 354/403 |
| 4,688,919 | 8/1987 | Ogawa et al. | 354/403 |
| 4,696,559 | 9/1987 | Kondo | 354/403 |

FOREIGN PATENT DOCUMENTS 262142 12/1985 Japan ................................. 354/400

Primary Examiner—W. B. Perkey
Attorney, Agent, or Firm—Young & Thompson

[57] ABSTRACT

An automatic focusing camera which is equipped with a taking lens system changeable in focal length between at least two different focal lengths: a relatively short focal length suitable for wide-angle photography, and a relatively long focal length suitable for telephotography. When the taking lens system is changed to have the relatively short focal length, the taking lens is further changed to be able to take close-up photographs and the automatic focusing is simultaneously changed to cover a short subject distance range between, for example 0.1 and 1.0 m.

4 Claims, 8 Drawing Sheets

FIG. 1
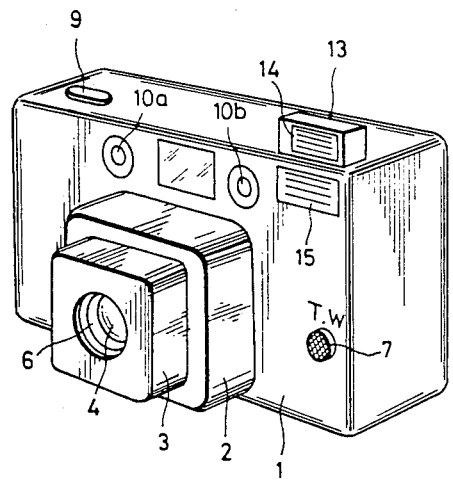
FIG. 2a
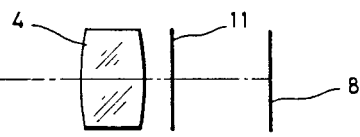
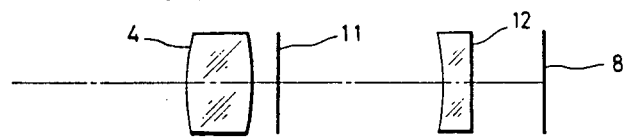
FIG. 2b
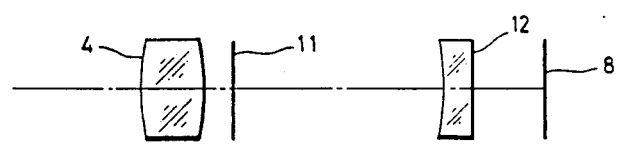
FIG. 2c 4,792,822

CAMERA WITH CHANGEABLE FOCAL LENGTH

BACKGROUND OF THE INVENTION

The present invention relates to a camera equipped with an automatic focusing device, and more particularly to an automatic focussing camera of the type having a taking lens system which can be changed suitably for wide-angle photography, telephotography or macro photgraphy by changing the focal length thereof.

Numerous compact cameras having lens shutters are already known. Some such compact cameras are provided with taking lenses of the type in which the focal length can be changed between a relatively short focal length of about 35 mm suitable for wide-angle photography and a relatively long focal length of about 70 mm suitable for telephotography. For changing the foacl length of the taking lens system in such a camera, an extra lens is provided which is displaced from the optical path of the taking lens when the taking lens system is changed to short focal length and, on the other hand, is moved into the optical path simultaneously with the movement of the main focusing lens of the taking lens when changing to long focal length. In many cases, the camera with a taking lens changeable between two different focal lengths is adapted to adjust the focus of the taking lens with the aid of a photoelectric automatic focusing system.

A recent tendency in such cameras is to provide a macro-photographic feature that enables taking close-up photographs of a subject, for example at a distance between about 1 and 100 cm. For this macro photography, it is necessary to extend the focusing range in which the taking lens can be correctly focused on a subject which is quite close to the camera. One problem associated with such a camera having a macro-photographic capability is the bulky and complicated automatic focusing mechanism which is required by the fact that the automatic focusing mechanism must cover a wider range of focusing distance. For covering the widened range of focusing distance, the photoelectric automatic focusing system has to have light projecting and light receiving means which are complicated in construction and large in size. Although it may be permissible to provide an extra automatic focusing system, it is not advantageous from a standpoint of cost and saving space in the camera.

Usually an automatic focusing system is adapted to adjust the taking lens system to a predetermined number of focusing distances between the closest distance and an infinite distance. Therefore, the focusing distances to which the focus of the taking lens is adjusted are set relatively roughly. If a close subject distance range, in which taking lens systems have generally had a relatively shallow depth of field, is provided with a relatively large number of distance settings, the number of distance settings will be correspondingly smaller in the normal or standard subject distance range in which photographs are usually taken most frequently. In addition, the taking lens has to have a large sliding distance in order to cover the whole subject distance range between the closest and infinite subject distances, and this increases the time required for the focus adjusting operation of the taking lens.

OBJECT OF THE INVENTION

It is, therefore, an object of the present invention to provide a camera with automatic focusing, which can be changed in focal length and which can adjust precisely the focus of the taking lens over a wide range between a close and an infinite subject distance.

SUMMARY OF THE INVENTION

For accomplishing the above object, the present invention provides the camera equipped with an automatic focusing device comprising a movable member holding at least a part of a taking lens system which is moved axially by means of a shift mechanism actuated by an electric motor so as to change the taking lens system between at least two different focal lengths, shift means for shifting said at least a part of the taking lens system axially with respect to the movable member so as to set the taking lens system suitably for close-up photography, and means for changing the distance detecting range of the automatic focusing device to a close distance range upon setting the taking lens system suitably for close-up photography.

BRIEF DESCRIPTION OF THE DRAWINGS

FIG. 1 is a perspective view showing an automatic focusing camera embodying the present invention;

FIGS. 2(A), (B) and (C) are diagrammatical illustrations showing the taking lens system having different focal lengths;

DETAILED DESCRIPTION OF THE INVENTION

Figure 3:
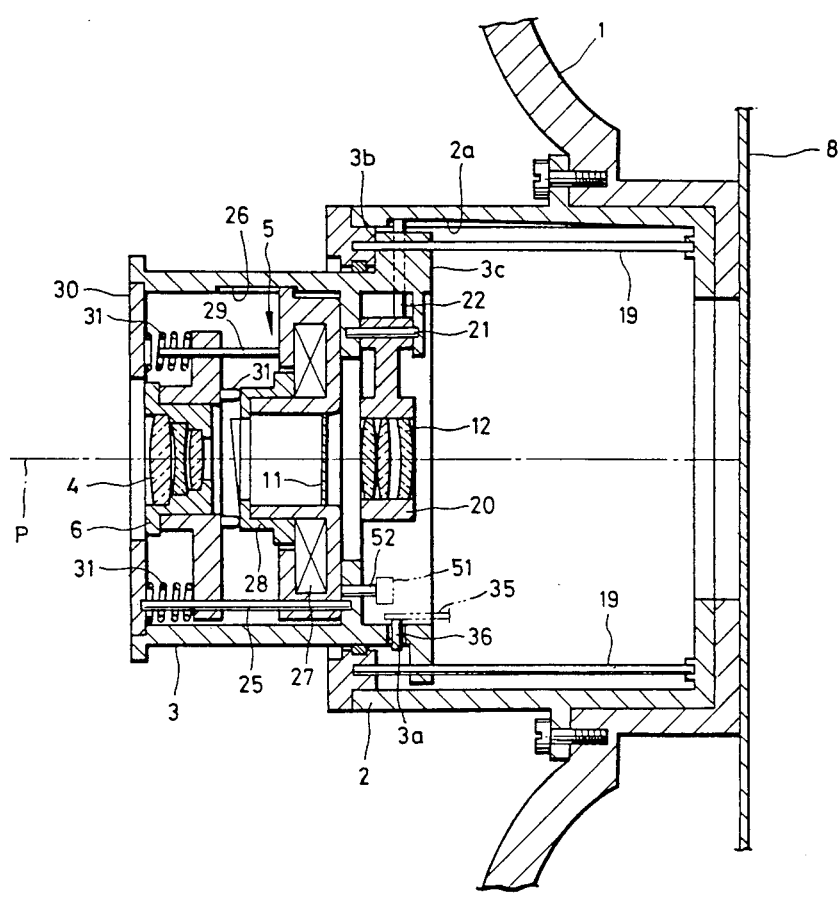
FIG. 3 is a cross sectional view showing the essential mechanism for changing the taking lens system.

Referring now to the drawings, in particular to FIG. 1, there is shown a compact camera embodying the present invention which has a camera body 1 provided with a fixed outer lens barrel 2. Supported by this outer barrel 2 for axial movement is a movable inner barrel 3 which supports therein a movable unit 5 including a lens barrel 6 with a taking lens system 4 incorporated therein. This movable unit 5, which can move axially in and relative to the inner barrel 3, incorporates therein a mechanical driver actuated in cooperation with an automatic focusing device described later to move axially the lens barrel 6 so as to adjust the focus of the taking lens system 4, and a shutter mechanism. It is to be noted that the lens barrel 6 is movable relative to the movable unit 5.

The camera body 1 is provided on its front wall with a photographic mode selecting button 7 for selectively setting the taking lens system 4 to a wide-angle photographic mode (which is hereinafter referred to as a wide-angle mode for simplicity) or a telephotographic mode (which is hereinafter referred to as a telephoto mode for simplicity), a popup type flash lamp assembly such as a strobe flash 13 with a diffusion plate 14, a fixed diffusion plate 15, light projecting means 10a and light receiving means 10b of an activetype automatic focusing device, and on its top wall a shutter release button 9.

If the camera has been set to the wide-angle mode in which the taking lens system has a relatively short focal length of, for example, about 35 mm, the taking lens system 6 has a lens arrangement in which the master lens 4 is at the closest position to a film 8 as is shown in FIG. 2(A). When the camera is set to the wide-angle mode and the shutter button 9 is pressed in half way, the automatic focusing device is actuated, causing the light projecting means 10a to project a light beam toward the subject to be photographed in order to detect the subject distance. The light reflected from the subject is received by the light receiving means 10b to determine the distance of the subject. Consequently, according to the determined subject distance, the lens barrel 6 having the master lens 4 is axially shifted with respect to the movable unit 5 so as to focus the taking lens on the subject. Thereafter, the shutter 11 is actuated to open and close, effecting an exposure.

Upon pushing the photographic mode selecting button 7 in a direction to set the camera in the tele-angle mode, the movable barrel 3 is moved to shift the master lens forwardly and, simultaneously, a conversion lens 12 is inserted in the optical path and is brought into axial alignment with the master lens 4 as is shown in FIG. 2(B). As a result, the taking lens system including the master lens 4 and the conversion lens 12 provides a telephotographic lens arrangement having a focal length of, for example, about 70 mm. In the same manner as in the wide-angle mode, the camera is operated to make an exposure by pushing the shutter release button 9.

The camera set to the telephoto mode can be shifted to a macro-photographic mode (which is hereinafter referred to as a macro mode for simplicity). In this macro mode, the taking lens system has the lens arrangement shown in FIG. 2(C). As will be specifically described later, the camera is set in the macro mode by further moving the movable unit 5 forwardly to space the master lens 4 farther from the film 8.

As is well known to those skilled in the art, when the camera is set to the wide-angle mode, the pop-up strobe flash 13 is retracted in the camera body 1. Therefore, the diffusion plates 14 and 15 in combination govern the distribution of flash light from the strobe flash 13 for the wide-angle mode. On the other hand, when the camera is set to the telephoto mode or the macro mode, the strobe flash 13 pops up and the distribution of light is governed only by the diffusion plate 14 attached to the strobe flash 13.

As is shown in FIG. 3, the fixed barrel 2 is provided with a pair of guide rods 19 along which the movable barrel 3 moves axially. As is apparent from the previous description, the movable barrel 3 is moved between a forward telephotographic position and a rearward wide-angle position. For placing the movable barrel in position, the movable barrel 3 is formed integrally with a positioning member having forward and rearward positioning surfaces 3b and 3c which abut against respective front and rear inner walls of the fixed barrel 2.

A lens barrel 20 holding therein the conversion lens 12 is pivotally mounted on a shaft 21 fixed in the movable barrel 3. Slidably received in the positioning member of the movable barrel 3 is a pin 22 of which the top end is engaged by a cam groove 2a formed in an inner wall of the fixed barrel. Due to the cam groove 2a-pin 22 engagement, the lens barrel 20 is swung up into the optical path P of the lens system when the movable barrel moves forwardly, namely toward the left as viewed in FIG. 3. Conversely, the lens barrel 20 leaves the optical path P when the movable barrel 3 moves rearwardly to the right as seen in FIG. 3.

The movable unit 5 is supported by a guide rod 25 and a guide groove 26 in which a projection on the movable unit 5 is received for axial movement along the optical path P. Mounted on the movable unit 5 are the shutter 11, a stepping motor 27 for opening and closing the shutter 11, a focusing cam member 28 cooperated with the stepping motor 27, and a guide rod 29 extending forwardly. The lens barrel 6 holding therein the master lens 4 is supported by the guide rods 25 and 29. Between the lens barrel 6 and front board 30 there are coil springs 31 that urge the lens barrel 6 rearwardly. On the back side of the lens barrel 6 there are cam follower pins 31 in contact with the focusing cam member 28.

Figure 4:
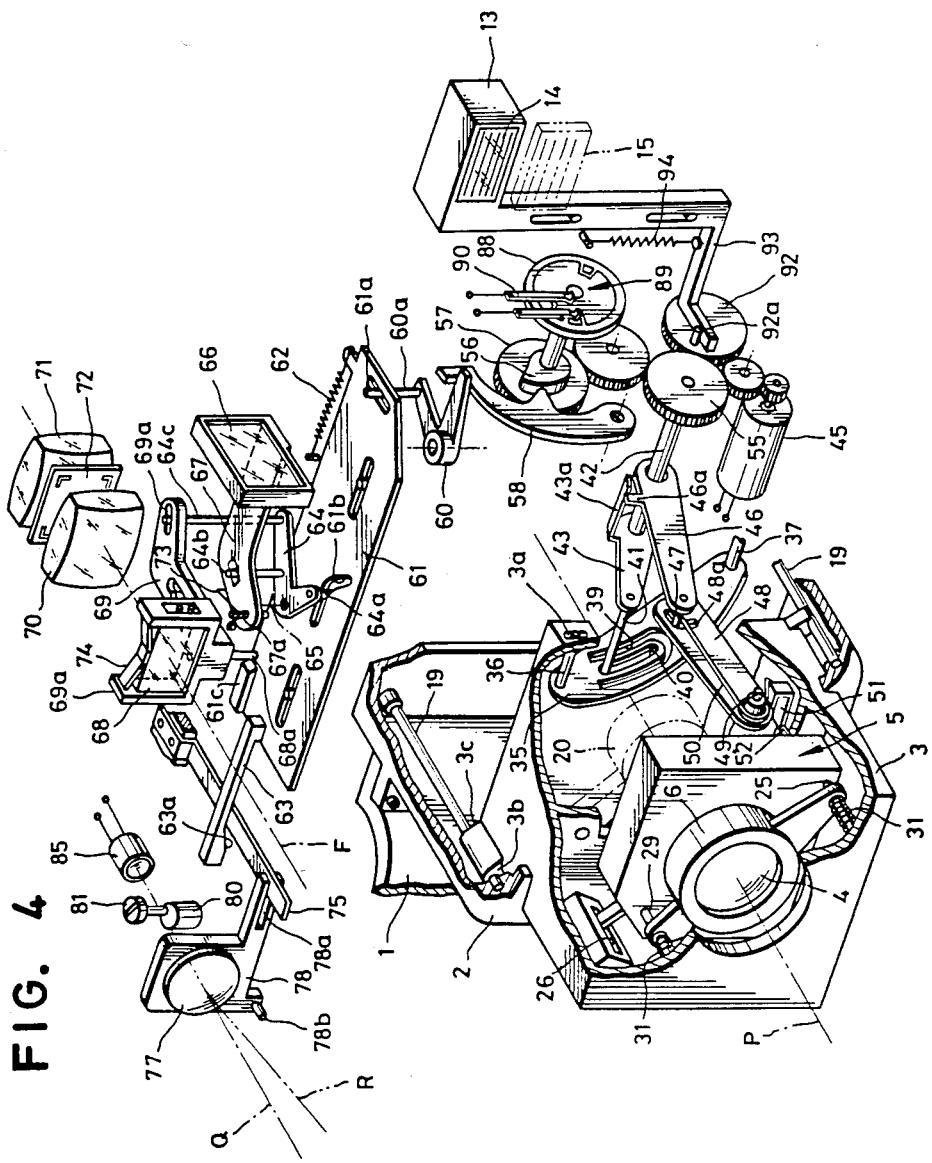
FIG. 4 is an exploded perspective view showing the essential parts of the camera of FIG. 1.

Reference is now had to FIG. 4 for a description of the movable elements, the movable barrel 3 and the movable unit 5. In a rear portion of the movable barrel 3 there is formed a vertical slot 3a which receives a connecting pin 36 fixed to one end of a thrusting lever 35 made of, for example, a thin resilient metal plate. This thrusting lever 35 is pivotally mounted on the camera body 1 for pivotal movement. AT the middle of the thrusting lever 35 there is a slot 40 surrounded by a generally U-shaped slot 39. This slot 40 receives a connector rod 41 extending from a rotatable arm 43 fixed to a shaft 42 whose opposite end is fixed to a gear 55. This rotatable arm 43 is rotated by means of a motor 45 through a gear train.

A shift lever 46, which functions to shift the lens system into the macro mode, is mounted for rotation on and relative to the shaft 42. The shift lever 46 is provided near its pivoted end with a lug 46a in engagement with a projection 43a extending laterally from the lever 43. Through this engagement, the shift lever 46 is turned when the lever 43 turns in the counterclockwise direction through a certain angle. Fixed to the outer end of the shift lever 46 is an actuating pin 47 which engages with a generally L-shaped slot 48a formed in a link lever 48. This link lever 48 is mounted for rotation on a pivot 49 fixed t the interior of the fixed barrel 2. Disposed between the actuating pin 47 and the link lever 48 is a torsion spring 50 by means of which swinging movement of the shift lever 46 is transferred to the link lever 48. Specifically, counterclockwise rotation of the shift lever 46 causes the actuating pin 47 to bend torsion spring 50 downwardly. As a result, the link lever 48 turns clockwise about the pivot 49.

The link lever 48 is provided at its pivoted end with a push lug 51 formed integrally therewith which pushes a pin 52 (see FIG. 3) which is fixed to a rear end portion of the movable unit 5 and which passes through a partition wall of the movable barrel 3 when link lever 48 turns in a clockwise direction.

The gear 55 fixed to one end of the shift 42 is coupled to a gear 57 provided with a cam member 56 fixed thereto through an idler gear. Cam member 56 bears against the cam lobe of the cam member 58. Therefore, rotation of the gear 55 causes the cam member 56 to turn, swinging the cam follower lever 58. When the cam follower lever 58 springs counterclockwise as seen in FIG. 4, a crank lever 60 is turned clockwise so as t shift a slide plate 61. For causing this shift of the sliding plate 61, the crank lever 60 and the sliding plate 61 are coupled by means of a pinslot arrangement 60a-61a. The sliding plate 61 is urged by a spring 62 to move back to the left as viewed in FIG. 4.

The sliding plate 61 is formed with a dog leg-like cam slot 61b at its middle in which is engaged a pin 64a fixed to a lever 64. Plate 61 has a raised portion 61c at one end thereof and an arm 63 is fixed to that same end of plate 61. The lever 64 with connecting rods 64b and 64c fixed thereto is pivotally mounted on a shaft 65 fixed to the camera body 1. These connecting rods 64b and 64c engage respectively in a slot formed in a first holding lever 67 for a first movable lens 66 of a finder optical system, and a slot 69a formed in a second holding lever 69 for a second movable lens 68 of the finder optical system. The first holding lever 67 is urged by means of a spring 73 to turn clockwise.

Figure 7A:
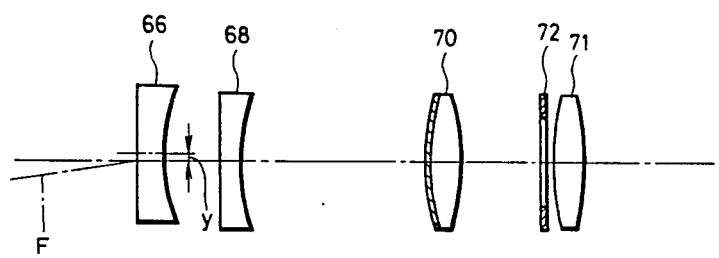
FIGS. 7(A), (B) and (C) are diagrammatical illustrations showing a finder optical system used in the camera of FIG. 1.
Figure 7B:
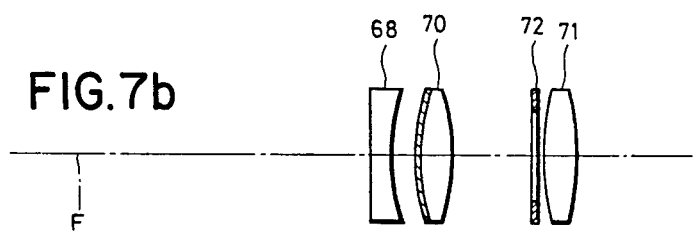
Figure 7C:
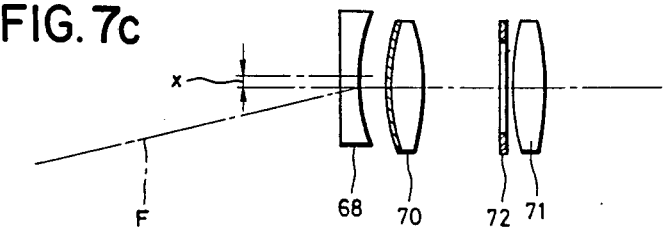

The finder optical system, as is shown in FIG. 7, comprises first and second movable lenses 66 and 68, fixed lenses 70 and 71, and a reticle 72. Onto the front surface of the fixed lens 70 a half-mirror coating layer is applied. As is well known in the art, an image of a viewing frame of the reticle 72 is observed through the fixed lens 71.

When the lever 64 turns in cooperation with a sliding motion of the sliding plate 61, the first holding lever 67 is turned about a shaft 67a through the pin-slot arrangement at 64b and, on the other hand, the second holding lever 69 is moved along the optical axis F of the finder optical system through the pin-slot arrangement 64c-69a. When, for example, the sliding plate 61 moves from the position shown in FIG. 4 toward the left, the lever 64 turns clockwise, turning the first holding lever 67 clockwise so as to place the first movable lens 66 on the optical axis F and, simultaneously, moving the second holding lever 69 forwardly along the optical path F to shift the second movable lens 68.

The second movable lens 68 is adapted to move vertically in a holding frame 69a which is fixed to the second holding lever 69. Specifically, the second movable lens 68 is ordinarily pressed downward by means of a leaf spring 74 attached to the top end of the holding frame 69a so as normally to be in its lowered position as shown in FIG. 4. When the sliding plate 61 moves to the right, the raised portion 61c formed on the sliding plate 61 raises a leg 68a integral with the second movable lens 68, against the action of leaf spring 74, thereby raising the second movable lens 68.

The arm 63 fixed to the sliding plate 61 has at its free end a tapered portion 63a which functions to push down a leaf spring 75 fixed to the camera body 1 upon the movement of the sliding plate 61 to the right as seen in FIG. 4. The leaf spring 75 is disposed at its free end between the tines of a fork 78a of a lens holder 78 for a light projection lens 77 of an automatic focusing device. This lens holder 78, which is mounted for rotation on a pin 78b, is turned in the clockwise direction until stopped by a stopper 80 when the leaf spring 75 bends downwardly. For adjusting the lens holder 78 to stop at a desired position, the stopper 80 includes an eccentric member turned by turning an adjusting knob 81.

As is shown in FIG. 4, there are the light projecting lens 77 described above disposed in front of the light projecting means 10a (shown in FIG. 1) of the automatic focusing device and a light emitting element 85 such as an infrared light emitting diode disposed behind the light projecting means 10a. The light projecting means 10a has its optical axis Q parallel with the optical axis P of the taking lens system when the lens holder 78 is in the position shown in FIG. 4. This light projecting lens 77 is turned by the leaf spring 75 bent by the sliding movement of the sliding plate 61 to the right as seen in FIG. 4, to shift its position to the side of the light receiving means 10b (shown in FIG. 1); the optical axis of the light projecting means 10a is inclined inwards.

The gear 57 with the cam member 56 attached thereto is connected to a control disk 88 by a connecting shaft. The control disk 88 is provided on its one surface with a contact arrangement 89 which is contacted by a pair of contact legs 90 to detect a lens position, namely a wide-angle mode position, a telephoto mode position, or a macro mode position, into which the lens system is shifted by the electric motor 45.

A gear 92 coupled to the electric motor 45 through a gear train including the gear 55 is provided with a pin 92a that cooperates with a connecting lever 93 of the strobe flash 13. When the gear 92 turns in the counterclockwise direction starting from the position shown in FIG. 4, the pin 92a pushes down the connecting lever 93 against the action of a return spring 94 so as to retract the strobe flash 13 within the camera body behind the diffusion plate 15. On the other hand, when the gear 92 is reversed, the pins 92a allows the connecting lever 93 to move up by means of the return spring 94, placing the strobe flash 13 in raised position as is shown in FIG. 4.

Figure 5:
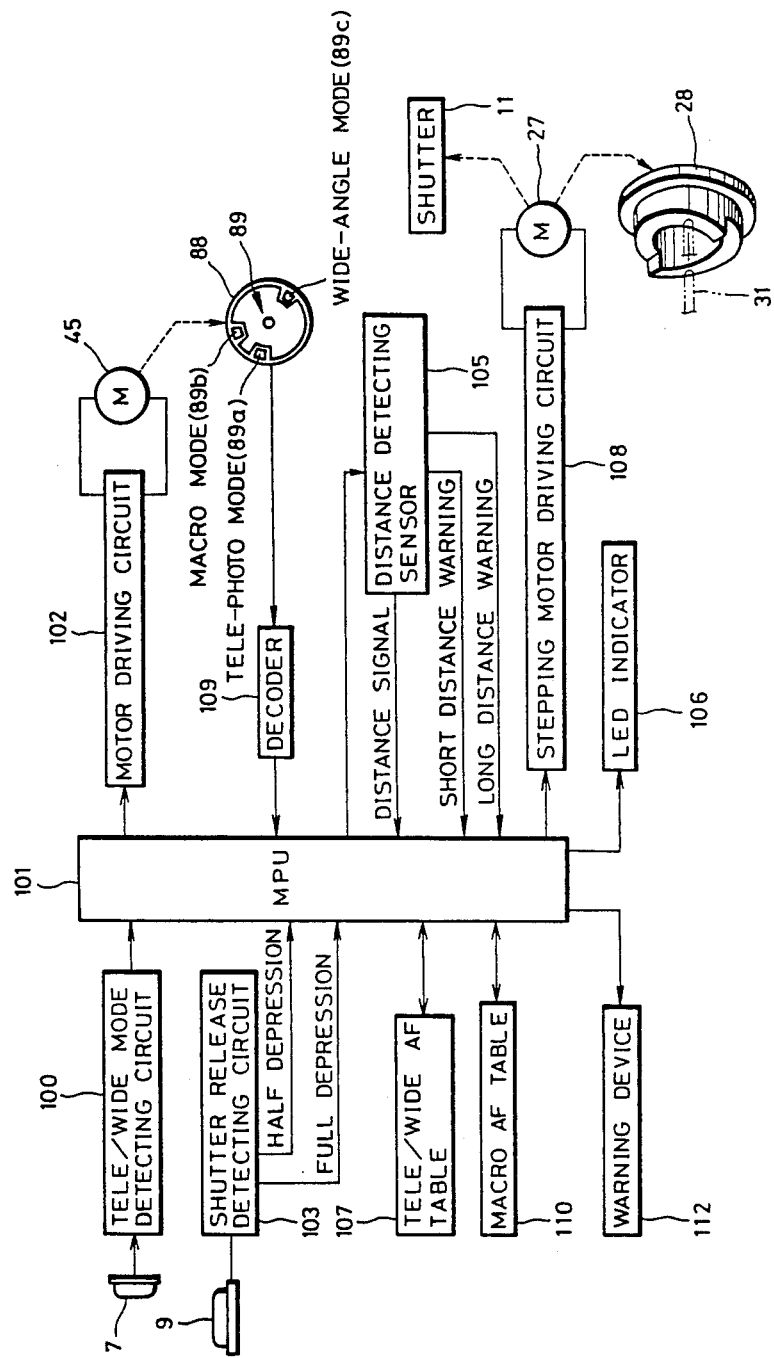
FIG. 5 is a block diagram showing the circuit used in the camera of FIG. 1.
Figure 6:
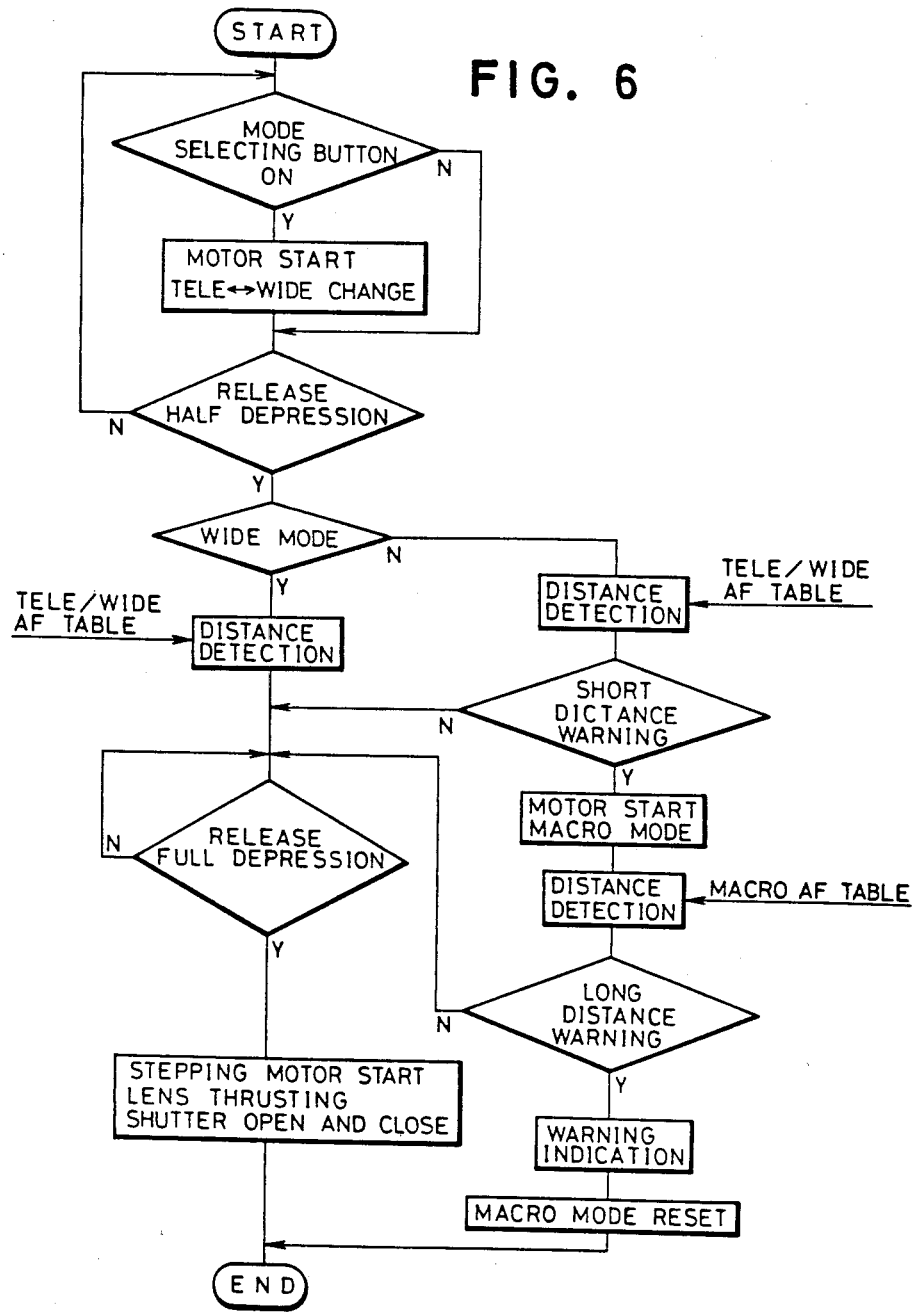
FIG. 6 is a flow chart showing the operation sequence of the camera of FIG. 1.

The camera thus constructed cooperates with the circuit shown in FIG. 5 and follows the operation sequence shown in FIG. 6. Assuming that the camera shown in FIG. 4 is set to the telephoto mode, the finder optical system has a lens arrangement shown in FIG. 7 (B) comprising the lens elements 68, 70 and 71 which has a magnification suitable for telephotography. If in fact the camera is set to the telephoto mode, a telephoto/wide-angle (hereinafter T-W) mode detecting circuit 100 provides a micro-processor unit (MPU) 101 with a T-mode signal. Upon depressing the shutter release button 9 by a half of its stroke, a shutter release signal is applied to the MPU 101 through a release detecting circuit 103. Upon the application of this shutter release signal, the MPU 101 confirms a selected mode, namely the telephoto mode in this sequence and, thereafter, starts the automatic focusing device to operate.

Figure 8:
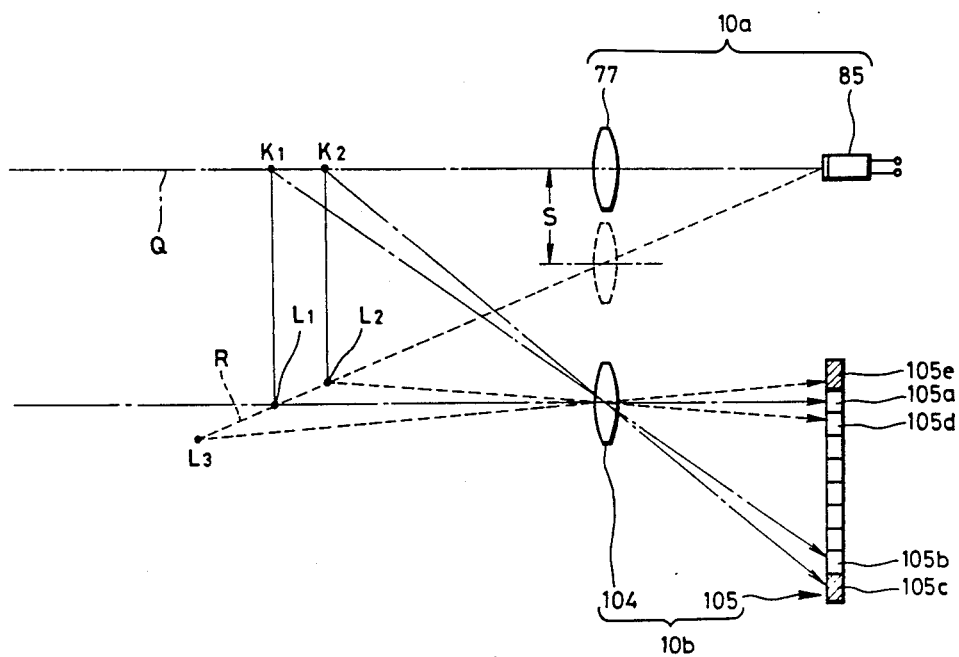
FIG. 8 is an illustration showing the principle of an automatic focusing device used in the camera of FIG. 1.

The automatic focusing device, as is shown in FIG. 8, projects light emitted from the light emitting element 85 toward the subject to be photographed through the projection lens 77. The light reflected from the subject is received by a distance-detecting sensor 105 through a lens 104. This distance-detecting sensor 105 comprises a number of light receiving elements 105a, 105b, ... arranged in a line along the base line of the finder. As is well known in the art, the position on the distance-detecting sensor 105 where the reflected light impinges is dependent on the subject distance. Specifically, the reflected light is received by the light receiving element 105a if the subject is at an infinite distance and by the light receiving element 105b if the subject is at a distance K1. Therefore, the actual subject distance can be found from which the light receiving element receives the reflected light.

A distance signal provided by a specific light receiving element that receives the reflected light is applied to the MPU 101 and a judgment is made whether the detected subject distance is within the allowable range for telephotography. If the MPU 101 judges that the subject is within the allowable range, then MPU 101 causes an LED indicator 106 to give a signal, for example, in the finder of the camera and readies the shutter release button 9 for an exposure. At the same time, the distance signal is referred to data memorized in a table memory 107 for T-W automatic focusing to determine the angle through which the stepping motor 27 must turn stepwise. When the shutter release button 9 is fully depressed, a driving signal representative of the determined angle is applied to a stepping motor driving circuit 107, turning the stepping motor 27 stepwise according to the subject distance so as to turn the focusing cam member 28 in order to focus the taking lens system.

When the focusing cam member 28 turns, the lens barrel 6 is axially moved by the pins 31 to place the master lens 4 in a position wherein the taking lens system including the conversion lens 12 is correctly focused. Thereafter, the stepping motor 27 turns further through a predetermined angle after placing the master lens 4 in position so as to cause the shutter to open and close. In such a way, the camera performs one full operation for exposure.

Figure 9:
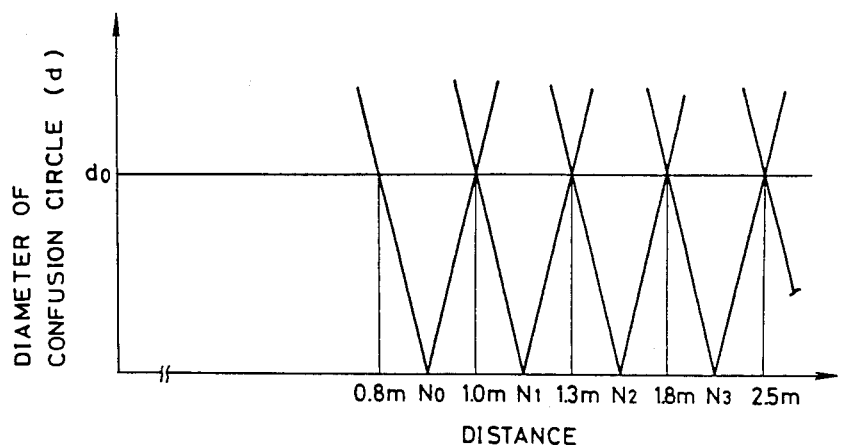
FIG. 9 is an explanatory illustration showing the relationship between suitable focusing distance and confusion circle in the wide-angle photographic and telephotographic modes.

In the telephoto mode, if the subject is at, for example, position K2 shown in FIG. 8, the reflected light is received by the light receiving element 105c. If the light receiving element 105c actually receives the reflected light, a signal is provided to indicate that the taking lens system having the lens arrangement shown in FIG. 2 (B) is out of focus by only an amount that can be corrected by rotation of the focusing cam member 28. A more detailed description of this will be given with reference to FIG. 9, which is a diagram whereon the X-axis indicates subject distance and the Y-axis indicates the diameter d of the circle of confusion on a film. In this diagram, Nn is representative of the most suitable focusing distance to which the focus of the taking lens system is adjusted in order to focus correctly on a subject by shifting the master lens 4 stepwise by means of the stepping motor 27.

Letting the minimum diameter of the confusion circle on the film surface 8 based on which the taking lens system is considered to be correctly focused on a subject be $d_0$, and when, for example, the most suitable focusing distance to which the focus of the taking lens system is adjusted is the distance $N_2$, the taking lens system can focus on a subject in a distance range between 1.3 m and 1.8 m because of the depth of field of the taking lens system. However, when the most suitable focusing distance is $N_0$ which is the closest subject distance, the taking lens system can focus on a subject beyond 0.8 m, but not at a distance shorter than 0.8 m because the diameter of confusion circle increasingly becomes larger than the minimum diameter $d_0$. In this case, as was previously described, the light reflected from a subject at a distance less than 0.8 m will be received by the light receiving element 105c and a distance signal is produced as a short distance warning signal.

When the short distance warning signal is produced by the distance detecting sensor 105, the shutter release button 9 is prevented from being fully depressed. At this time, the MPU 101 provides the motor driving circuit 102 with a driving signal which in turn serves automatically to change the operation mode of the camera from the telephoto mode to the macro mode. More specifically, the motor 45 is caused to rotate to turn the gear 55 in the counterclockwise direction from the position shown in FIG. 4. Consequently, the lever 43 swings in the counterclockwise direction, swinging the shift lever 46 in the counterclockwise direction with the projection 43a. By the motion of the shift lever 46, the link lever 48 is turned in the clockwise direction as a result of bending of the torsion spring 50.

Although the lever 43 is swung in order to turn the link lever 48 in the clockwise direction, since the movable barrel 3, in the telephoto mode, is in the forwardmost position and is prevented from being thrust forwardly any farther by the fixed barrel 2, the thrusting lever 35 is prevented from being turned by the lever 43. In this condition, the lever 43 is forced to turn in the counterclockwise direction, forcing the connecting rod 41 to move along the slot 40 of the thrusting lever 35. As was previously stated, as the slot 40 is surrounded by the U-shaped slot 39, the connecting rod 41 can move along the slot 40 while deforming that portion of lever 35 wherein the slot 40 is formed. As a result, the thrusting lever 35 stores a return spring force which tends to thrust the movable barrel 3 forwardly, thus retaining the movable barrel 3 in the forwardmost position shown in FIG. 4.

As was described above, when the link lever 48 is turned clockwise while retaining the movable barrel 3 in the forwardmost position, the link lever 48 with the push lug 51 thrusts the movable unit 5 forwardly via the pin 52 of the movable unit 5. In this way, the lens system is shifted into the macro mode from the telephoto mode and, simultaneously, the gear 57 turns in the counterclockwise direction of FIG. 4 to slide the sliding plate 61 to the right through the cam follower lever 58 and the crank lever 60.

The movement of the sliding plate 61 to the right causes the raised portion 61c to push up the leg 68a so as to raise the lens 68 by a distance x as is shown in FIG. 7 (C) in order to incline the optical axis F of the finder optical system downwardly. Due to this inclination of the optical axis F of the finder optical system, the finder cancels the parallax so as to be suitable for macro photography. Simultaneously, the movement of the sliding plate 61 to the right causes the holder 78 holding the light projecting lens 77 to turn about the pin 78b until stopped by the stopper 80. As a result, the light projecting lens 77 shifts sideways by a distance s toward the distance detecting sensor 105 as is shown by a dotted line in FIG. 8.

Upon the completion of shifting the movable unit 5 as well as the lens 68 of the finder optical system and the light projecting lens 77, the contact legs 90 detect contacts 89b of the control disk 88 for macro mode as is shown in FIG. 5 to provide a signal which in turn is applied to the MPU 101 through a decoder 109. Then the MPU 101 provides the motor driving circuit 102 with a stop signal by which the motor 45 is stopped, completing the setting of the camera to the macro mode.

As was previously described, when shifting the light projecting lens 77 laterally by a distance S to a position shown by a dotted line in FIG. 8, the optical axis Q of the light projecting means is deflected as shown by a chained line R. Then the light receiving element 105a which receives the light reflected from the subject at an infinite distance when the camera is set to the telephoto mode, receives the light reflected from the subject at a distance $L_1$ equal to the distance $K_1$. The light receiving element $105d$ receives the light reflected from the subject at a distance $L_2$ equal to the distance $K_2$ which is out of the range for which the taking lens system is set. Therefore, the range in which the automatic focusing device can detect distance is shifted closer to the camera.

More specifically, the closest suitable focusing distance $N_0$ of the taking system of the camera in the macro mode is of course closer than that in the telephoto mode. If the photographic field is divided into, say, 20 increments of suitable focusing distance by the automatic focusing device of the camera, the farthest suitable focusing distance $N_{20}$ of the taking lens system of the camera is shifted to a position shown in FIG. 10 when the camera is changed to the macro mode. As is clearly shown in FIG. 10, the farthest suitable focusing distance is predetermined in such a way that the taking lens system adjusted to the farthest suitable focusing distance has a depth of field that partly overlaps the depth of field when adjusted to the closest suitable focusing distance $N_0$ in the telephoto mode. This overlapping distance is so determined as to allow the taking lens system to be focused on a subject between distances 0.8 and 0.85 in either of the telephoto and macro modes. This overlapping distance, which is shown by a reference character 1 in FIG. 10, corresponds to the shifted distance s of the light projecting lens 77 and, therefore, is established by adjusting the stopper 80 through the adjusting knob 81.

Due to the overlap of the depths of field between the closest suitable focusing distance N0 in the telephoto mode and the farthest suitable focusing distance $N_{20}$ in the macro mode, even though the automatic distance sensor 105 incorrectly detects the subject distance of a subject at about the closest distance 0.8 m when the camera is in the telephoto mode and the camera is changed to the macro mode by the provision of a close distance warning signal, the taking lens system changed to the macro mode and adjusted to the farthest focusing distance $N_2^0$ can catch the subject correctly in its depth of field.

After the change of the camera to the macro mode, the distance measurement is effected to detect subject distance while maintaining the light projecting lens 77 shifted by the distance s. In the macro mode, if the light receiving element $105a$ receives the light reflected from a subject, the subject distance is determined to be the farthest focusing distance and, therefore, a different operation is needed. Specifically, in the macro mode, a distance signal produced from the distance sensor 105 is used to determine angle through which the stepping motor 27 must turn, by referring to the W-AF table 110 for macro photography in place of the T/W-AF table 107 for telephotography/wide-angle photography. When the distance sensor 105 produces a distance signal which indicates the detected subject distance is in a range covered by the taking lens system in the macro mode, the LED indicator 106 emits light to indicate that the subject is at a correct distance in the same manner as described for the telephoto mode and allows the shutter release button 9 to be fully depressed.

Consequently, the shutter release detecting circuit 103 produces a full depression signal which is supplied to the MPU 101 so as to control the stepping motor 27 to turn through an angle corresponding to the distance signal through the stepping motor driving circuit 106.

The stepping motor 27, as was previously described, turns to place the lens barrel 6 holding the master lens 4 in position and, thereafter, to open and close the shutter 28, thus completing an exposure for macro photography.

Figure 10:
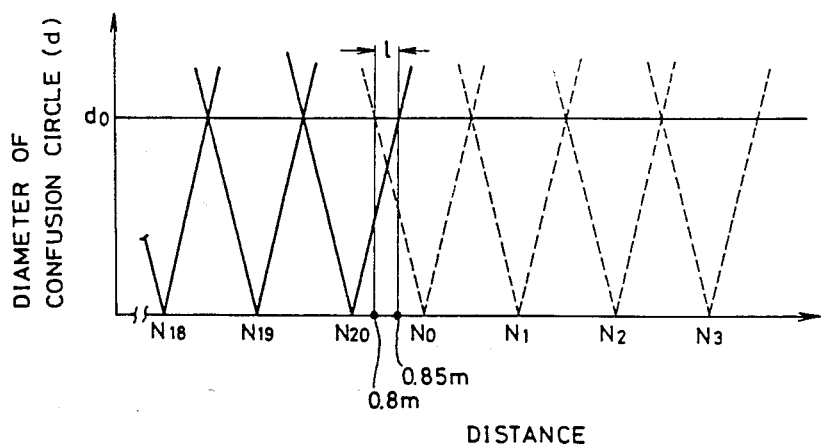
FIG. 10 is an explanatory illustration showing the relationship between suitable focusing distance and confusion circle in the macro photographic mode.

If the camera is moved during or after the changing of the camera to the macro mode and the position of the subject relative to the camera is changed to another position, for example to a position $L_3$ as is shown in FIG. 8, the taking lens system cannot be focused on the subject at the position $L_3$ in the macro mode because the subject is ut of the depth of field of the taking lens system adjusted to its farthest suitable focusing distance $N_{20}$ shown in FIG. 10. In this case, the light receiving element $105e$ of the distance sensor 105 receives the light reflected from the subject at the position $L_3$. If in fact the light receiving element $105e$ receives light, it produces a long distance warning signal which indicates that the taking lens system cannot be focused on the subject at the position $L_3$ in the macro mode and which in turn is applied to MPU 101. MPU 101, when receiving the long distance warning signal, prevents the shutter release button 9 from being fully depressed and actuates the warning device 112, so as to inhibit any further operation of the camera. The camera whose operation has been inhibited is restored to its initial state by discontinuing pressure on the shutter release button 9.

When the shutter release button 9 depressed half way is relieved of pressure, the camera is reset to the telephoto mode from the macro mode. Specifically, when the shutter release button is no longer pressed, the motor 45 undergoes reverse rotation until the telephoto mode contact $89a$ is detected by the contact legs 90 so as to return the movable unit 5 to the position shown in FIGS. 3 and 4, thereby resetting the camera to the telephoto mode.

Upon pushing the mode selection button 7 when the camera is set to the telephoto mode, the tele/wide mode detecting circuit 100 produces a wide mode selection signal which in turn is applied to MPU 101. As a result, MPU 101 causes the motor driving circuit 102 to drive the motor 45, turning the gear 55 in the clockwise direction as seen in FIG. 4 so as to swing the lever 43 in the same direction. Consequently, the movable barrel 3 is moved rearwardly in the fixed barrel 2 by the thrusting lever 35. By the rearward movement of the movable barrel 3, the lens holder 20 holding the conversion lens 12 is removed from the optical path P so as to place the taking lens system in the wide-angle mode shown in FIG. 3 (A) through the cam $2a$-pin 22 arrangement.

It is to be noted that the movable barrel 3 is stopped by the rear end of the fixed barrel 2 and that the motor 45, after the stopping of the movable barrel 3, turns slightly more until the wide-angle mode contact $89c$ is detected by the contact legs 90 so as to stop its rotation. This excessive turning of the motor 45 forces the lever 43 to swing in the counterclockwise direction as seen in FIG. 4 to resiliently deform the portion with the slot 40 formed in the thrusting lever 35 through the pin 41. Due to the resilient deformation of the thrusting lever 35, the movable barrel 3 is maintained in its rearwardly moved position wherein the taking lens system forms the lens arrangement for the wide mode.

In cooperation with the movement of the movable barrel 3 to the wide mode position, the slidable plate 61 is shifted to the left from the position shown in FIG. 4, turning the lever 64 in the clockwise direction through the pin 64-slot 61 arrangement. Consequently, the lever 69 holding the lens 68 is moved axially along the optical axis F of the finder optical system and, simultaneously, the lever 67 holding the lens 66 is turned in the clockwise direction to bring the lens 66 in line with the optical axis F, thereby forming the finder optical system shown in FIG. 7 (A). This lens 66 was previously shifted upwardly with respect to the optical axis F by a distance y so as to adjust the parallax of the finder as well as the magnification thereof suitably for wide angle photography. At this time, as the gear 92 is rotated in the counterclockwise direction, the strobe flash 13 is retracted behind the diffusion plate 15 in the camera body 1 through the pin 92a.

After having set the optical systems of the taking lens and the finder to the wide-angle mode, the shutter release button 9 is depressed by a half of its stroke to effect a distance measurement with reference to the tele/wide AF table 107 in the same manner as in the telephoto mode. Thereafter, the shutter release button 9 is fully depressed to focus the lens according to the detected distance and then to actuate the shutter, so as to complete a wide-angle exposure.

On the other hand, when pushing the mode selection button 7 when the camera is set to the wide-angle mode, the tele/wide mode detecting circuit 100 produces a telephoto mode signal which in turn is applied to MPU 101 to actuate the motor driving circuit 102. The motor 45 starts its rotation to turn the rotatable plate 43 in the counterclockwise direction with the aid of the gear 55, so as to thrust forward the movable barrel 3 by means of the thrusting lever 36. At the end f the forward movement of the movable barrel 3, the movable barrel 3 at its front surface 3b abuts against the rear end of the fixed barrel 2 before the motor 45 stops. Due to the further or excessive rotation of the motor 45, the portion with the slot 40 in the thrusting lever 35 is resiliently deformed by the pin 41 to store a restoring force in the thrusting lever 35 by which the movable barrel 3 is maintained in its telephoto mode position. In cooperation with the movement of the movable barrel 3, the slidable plate 61 is moved so as to change the finder optical system from the wide-angle mode optical arrangement shown in FIG. 7 (A) to the telephoto mode optical arrangement shown in FIG. 7 (B). Thereafter, the shutter release button 9 is fully depressed to perform the necessary operation in the same way as described for the wide-angle mode.

Although the present invention has been fully described by way of a preferred embodiment thereof with reference to the accompanying drawings, it is for example permissible to shift the light receiving lens 104 in front of the distance sensor toward the light projecting means 10a instead of shifting the projection lens 77 upon changing the distance detecting device to the macro mode position. It is also permissible to provide a button manually operated upon the short distance warning by the warning device to produce a signal for actuating the motor 45 to rotate to change the distance detecting device from the telephoto mode to the macro mode. It is to be noted that various other changes and modifications will be apparent to those skilled in the art. Therefore, unless otherwise such changes and modifications depart from the true scope of the present invention, they should be construed as included therein.

What is claimed is:

1. A camera having an automatic focusing device which has a taking lens system changeable in focal length between at least first and second focal lengths and which allows close-up photography when said taking lens system is changed to have said second focal length, said camera comprising:
    movable means by which at least a part of said taking lens system is supported for axial movement;
    mechanical shifting means actuated by an electric motor for axially moving said movable member to change said taking lens system so as to have said first or said second focal length;
    means allowing said electric motor to rotate excessively after said axial movement of said movable member to change said taking lens system so as to have said second focal length, thereby moving axially said part of said taking lens system so as to change said taking lens system suitable for close-up photography; and
    focusing range changing means that coact with said means for changing a focusing range of said automatic focusing device to a range suitable for said close-up photography.

2. A camera as defined in claim 1, wherein said movable means is supported by a movable lens barrel for axial movement relative to said movable lens barrel.

3. A camera as defined in claim 2, wherein said taking lens system includes a conversion lens supported by said movable lens barrel, ane means for removing said conversion lens from said taking lens system upon said axial movement of said movable lens barrel to change said taking lens system so as to have said first focal length.

4. A camera as defined in claim 1, wherein said automatic focusing device has light projecting means and light receiving means, said light projecting means including a light projecting lens which is shiftable toward said light receiving means by said excessive rotation of said electric motor.

* * * * *

UNITED STATES PATENT AND TRADEMARK OFFICE
CERTIFICATE OF CORRECTION

PATENT NO. : 4,792,822
DATED : December 20, 1988
INVENTOR(S) : Kazuhiro Akiyama et al It is certified that error appears in the above-identified patent and that said Letters Patent is hereby corrected as shown below:

On the title page correct the name of one of the inventors, "Toshio Yodhida" to -- Toshio Yoshida --.

Signed and Sealed this

Twentieth Day of June, 1989

Attest:

DONALD J. QUIGG

*Attesting Officer*     *Commissioner of Patents and Trademarks*